United States Patent [19]

Minami

[11] Patent Number: 5,029,088
[45] Date of Patent: Jul. 2, 1991

[54] METHOD OF AND APPARATUS FOR GUIDING A MOVING OBJECT

[75] Inventor: Mamoru Minami, Daito, Japan

[73] Assignee: Tsubakimoto Chain Co., Osaka, Japan

[21] Appl. No.: 344,294

[22] Filed: Apr. 25, 1989

[30] Foreign Application Priority Data

Oct. 14, 1988 [JP] Japan .................................. 63-259841

[51] Int. Cl.$^5$ .............................................. G05D 1/00
[52] U.S. Cl. .................................. 364/424.02; 180/168
[58] Field of Search ....................... 364/424.01, 424.02, 364/443; 180/167-169; 318/508.1

[56] References Cited

U.S. PATENT DOCUMENTS

| | | | |
|---|---|---|---|
| 4,530,057 | 7/1985 | Ahlbom | 364/424.02 |
| 4,700,302 | 10/1987 | Arakawa et al. | 364/424.02 |
| 4,772,832 | 9/1988 | Okazaki et al. | 318/587 |
| 4,800,977 | 1/1989 | Boegli et al. | 180/168 |
| 4,817,000 | 3/1989 | Eberhardt | 364/443 |
| 4,847,769 | 7/1989 | Reeve | 364/424.02 |
| 4,847,774 | 7/1989 | Tomikawa et al. | 364/449 |
| 4,852,677 | 8/1989 | Okazaki | 180/169 |
| 4,908,557 | 3/1990 | Sudare et al. | 318/587 |

FOREIGN PATENT DOCUMENTS 59-135514  8/1984  Japan .

OTHER PUBLICATIONS

A Method of Guiding Vehicles Automatically by Serial Order of a Course, pp. 35-38; a reference delivered at "4th Vehicle Automation Symposium" on Jan. 27 & 28, 1981.

Primary Examiner—Thomas G. Black
Attorney, Agent, or Firm—Darby & Darby

[57] ABSTRACT

The present invention is directed to a method of and an apparatus for guiding a moving object such as an unattended transporting vehicle traveling in a factory to travel along a preset traveling path including curves. In this method, curves in the traveling path are approximated to a series of circular arcs, each of which is set by the center, radius and gyrating angle of the circular arc, to detect a present attitude which is the present traveling position and moving direction of the moving object, determining a target attitude by the position of an intersecting point of a straight line, connecting the center of circular arc and the present traveling position of the moving object, with the circular arc, and the tangent direction on the intersecting point, setting a target position to be traveled on the basis of a guide error quantity including the positional deviation and directional deviation between the target attitude and present attitude of the moving object, calculating a radius of gyration from the present attitude to the target position set, and controlling the traveling of moving object by the calculated radius of gyration, thereby the moving object can be guided reliably even on the curved traveling path.

4 Claims, 4 Drawing Sheets

METHOD OF AND APPARATUS FOR GUIDING A MOVING OBJECT

BACKGROUND OF THE INVENTION

1. Field of the Invention

The present invention relates to a method of and an apparatus for guiding a moving object such as an unattended transporting vehicle and the like used in a factory for factory automation (FA), particularly, it relates to a guiding method and apparatus using a presumption navigation.

2. Description of the Prior Art

As methods of guiding a moving object such as an unattended transporting vehicle and the like, the following methods may be given, that is, a method of presetting a continuous traveling path by means of guide cables, optical tapes, etc. so as to move a car along the path, a method of incorporating the recognition function of the traveling path in the moving object itself, thereby peripheral environments of the traveling path are recognized by means of electric wave or light so as to move the car according to the information, and a method of applying the presumption navigation to guide the car.

The method of setting the traveling path by means of the guide cables costs much money and time for setting the path and can not be changed simply, and when using the optical tapes, the detecting accuracy of traveling path is deteriorated by stains on the tape surface due to accumulative uses. Also, in the method of recognizing the peripheral environments by the electric wave or light which is susceptible to external faults, the detecting accuracy is deteriorated.

As a method without such disadvantages, the method of applying the presumption navigation to input information of the traveling path to the moving object itself so as to be guided by the information is proposed in Japanese Patent Application Laid-Open No. 20508/1988 by the inventor of the present invention and others.

In this guiding method, a self-control vehicle starts from arbitrary position and detects the number of revolutions of right and left wheels at constant intervals respectively, then estimates its position and direction on the basis of the factor determined by the number of revolutions and wheel specification, sets a target position based on the estimated position and direction and travels along the preset traveling path as traveling to the target position, at each detection of marks arranged on suitable positions on the traveling path, corrects its position and direction as well as detects the deviation thereof at correction, changes the factor related to the deviation depending upon whether the deviation detected is of the position or direction, and travels as applying the changed factor as the new factor. Thereby, the guiding accuracy is improved and the self-control vehicle is no longer guided to the position far away from the marks.

In the conventional guiding method employing the presumption navigation, however, such a difficulty was encountered that, since the traveling path can be set only linearly and its freedom of setting is restricted, when the shunting operation is required for plural cars traveling on the same traveling path opposedly, the car can not be guided smoothly and the shortest path can not be selected, so that in the case where the moving time is restricted, it can not be shortened responding thereto.

SUMMARY OF THE INVENTION

The present invention has been devised in view of such circumstances, therefore, it is an object of the present invention to provide a method of and an apparatus for guiding a moving object, in which a curved traveling path is regarded as a series of circular arcs, a target attitude is determined by the position of an intersecting point of a straight line, connecting its center and the present position of an unattended vehicle, with the traveling path, and the tangent direction on the intersecting point, and a guide error is obtained by comparing therewith so as to guide freely even on the curved traveling path, thereby the moving time is shortened and the restriction of freedom of setting the traveling path is minimized.

In the present invention, the moving object can be guided even on the curved traveling path in such a manner that, the center of traveling path including circular arcs is set, the position of an intersecting point of a straight line, connecting the center and the present position of the moving object, with the circular arc, and the tangent direction on the intersecting point are determined as a target attitude, the deviation between the target attitude and the present position and moving direction is determined as a guide error quantity, on the basis thereof, the target position corresponding to the operator's point of sight is set, radius of gyration of the target course to the target position is calculated from the present attitude and target position, and the traveling of moving object is controlled responsive thereto.

The above and further objects and features of the invention will more fully be apparent from the following detailed description with accompanying drawings.

DESCRIPTION OF THE PREFERRED EMBODIMENTS

The present invention will be described with reference to the drawings showing an embodiment as follows.

Figure 1:
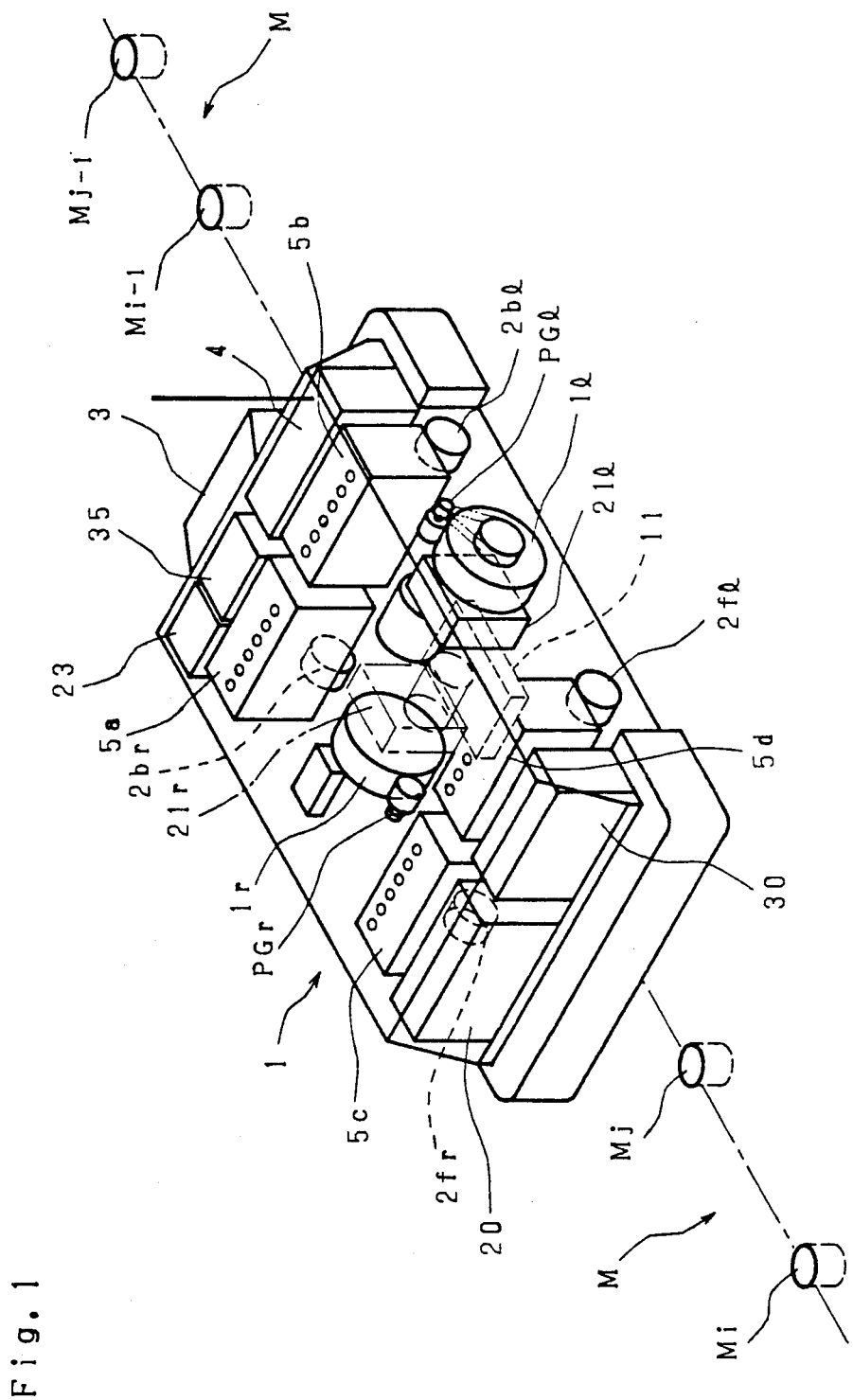
FIG. 1 is a perspective view showing the construction of an unattended transporting vehicle provided with an apparatus using a guiding method of a moving object according to the present invention.

In FIG. 1, the numeral 1 indicates a car body supported by a pair of right and left drive wheels 1*l*, 1*r* and casters 2*fl*, 2*fr*, 2*bl*, 2*br* disposed at the front, rear, right and left. The drive wheels 1*l*, 1*r* are coupled directly to motors 21*l*, 21*r* so as to be rotated independently, thereby the car body 1 is oriented. Pulse generators PGl, PGr which generate pulses responsive to respective number of revolutions of the motors 21*l*, 21*r* are disposed therewith, thereby the traveling position and direction of an unattended transporting vehicle are detected.

In the center under the car body 1, a magneto-detecting device 11 is disposed in alignment with the center of the car body 1 at its center, and calculates the relative position between the car body 1 and the fixed points M, M . . . for correcting the position, consisting of columnar magnets Mj, Mi buried in the traveling path on the floor at predetermined intervals.

On the car body 1, four batteries 5a, 5b . . . as a power source, an operating panel 3 used for setting the traveling path and operating the manual traveling of the car body 1, a wireless communication module 4 for communication between the car body 1 and outside, a detecting circuit 30 for processing output of the magnetic detecting device 11, a guide control circuit 20 for controlling the drive wheels 1l, 1r and guiding the car body 1 to the traveling path, a CPU 35 for controlling the detecting circuit and a CPU 23 for the guide control circuit 20 are installed.

Figure 2:
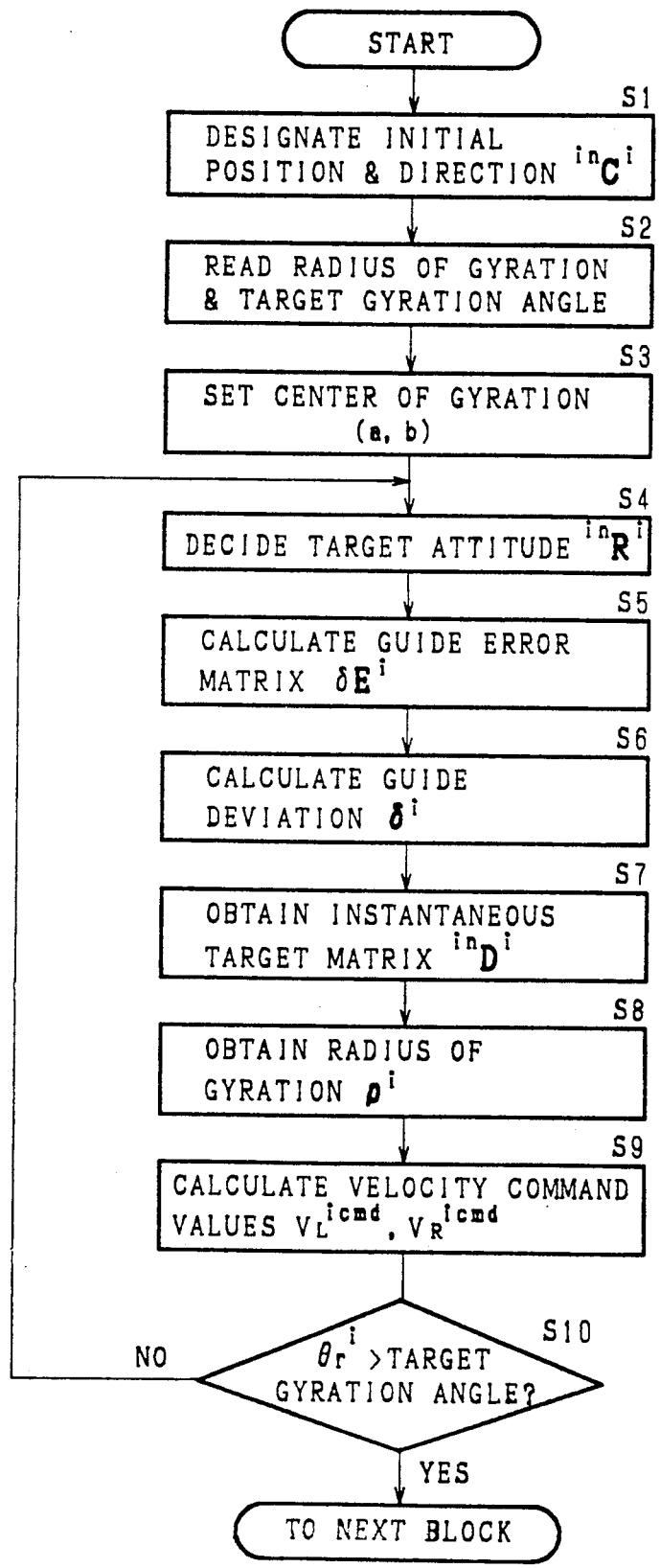
FIG. 2 is a flow chart showing the outline of guiding method.

Next, the outline of method of guiding the unattended vehicle along a traveling path formed by curves, which is a subject matter of the present invention, will be described according to a flow chart shown in FIG. 2.

First, as a premise, XY coordinates (hereinafter referred to as external coordinates) are set on the floor as calculating references of the direction of the absolute position of the car body 1, and its i th position and direction is represented by $^{out}C^i$. In respective attitudes, etc. indicated in vectors hereinafter, the moving direction is the y-axis positive direction and an origin is its vector basic point. In the guide control circuit 20 of the car body 1, the xy coordinates (hereinafter referred to as internal coordinates) are set as its own control references, and its i th position and direction is represented by $^{in}C^i$. Assume that the internal coordinates are in alignment with the external coordinates at the beginning of control ($^{in}C^i = {}^{out}C^i$).

A traveling path is set on the internal coordinates as well as on the external coordinates, and the car body 1 is basically guided as estimating the positions so as to follow the traveling path set on the internal coordinates. Thus, after the lapse of fixed time, between the position and direction $^{in}C^i$ of the internal coordinates and the position and direction $^{out}C^i$ of the external coordinates, an estimated error $\delta C^i ({}^{out}C^i = {}^{in}C^i \cdot \delta C^i)$ is produced, which is corrected and decremented by detecting the relative position with the fixed points M, M . . . when passing the fixed points M, M . . . on the floor.

As previously described, though it is problematic that the estimated error $\delta C^i$ increases in the presumption navigation, since the guiding method can be considered on the basis of attitude $^{in}C^i$ including the position and direction on the internal coordinates, it is expansible apart from the estimated error $\delta C^i$.

In the guiding method of the present invention, first, an initial present attitude $^{in}C^i$ including the initial position and direction of the car body 1 is designated (Step 1). Next, basic commands such as a radius of gyration and target gyrating angle, etc. of the traveling path are read (Step 2), and coordinates (a, b) of the center of gyration are set (Step 3). The coordinates of the intersecting point of the straight line, connecting the initial present attitude $^{in}C^i$ and the center of gyration, with the circular traveling path and the tangent direction on the intersecting point are decided as a target attitude $^{in}R^i$ (Step 4). After deciding the target attitude $^{in}R^i$, guide error $\delta E^i$ between the present attitude $^{in}C^i$ is defined and calculated by the following equation (1) (Step 5), $$^{in}C^i = {}^{in}R^i \cdot \delta E^i \quad (1)$$

and, a guide deviation $\delta^i (= \delta S^i \cdot \theta^i)$, which is the representation of vectors of a position deviation $\delta S^i$ and a direction deviation $\delta \theta^i$ included in the guide error $\delta E^i$, is calculated (Step 6).

Subsequently, on the basis of the guide deviation $\delta^i$ and the predicted time $t_p$, an instantaneous target matrix $^{in}D^i$ corresponding to the operator's point of sight is obtained (Step 7). Then, a circular arc passing the present attitude $^{in}C^i$ and instantaneous target matrix $^{in}D^i$ and contacting to the present angle $\theta_c^i$ axis is determined as an instantaneous target course in the i th control period, and its radius of gyration $\rho^i$ is obtained (Step 8). By the resulting radius of gyration $\rho^i$, velocity command values $V_L{}^{icmd}$, $V_R{}^{icmd}$ to the right and left drive wheels 1l, 1r are obtained (Step 9). In Step 10, it is determined whether the gyrating angle $\theta_r^i$ of the target attitude $^{in}R^i$ is larger, than the target gyrating angle. If not, the procedure is returned to Step 4 and Step 4 to Step 10 is repeated, and if larger the procedure is moved to guide to the traveling path in the next block where the center of gyration is different.

Next, the practical guiding method will be described using operational equations.

Figure 3:
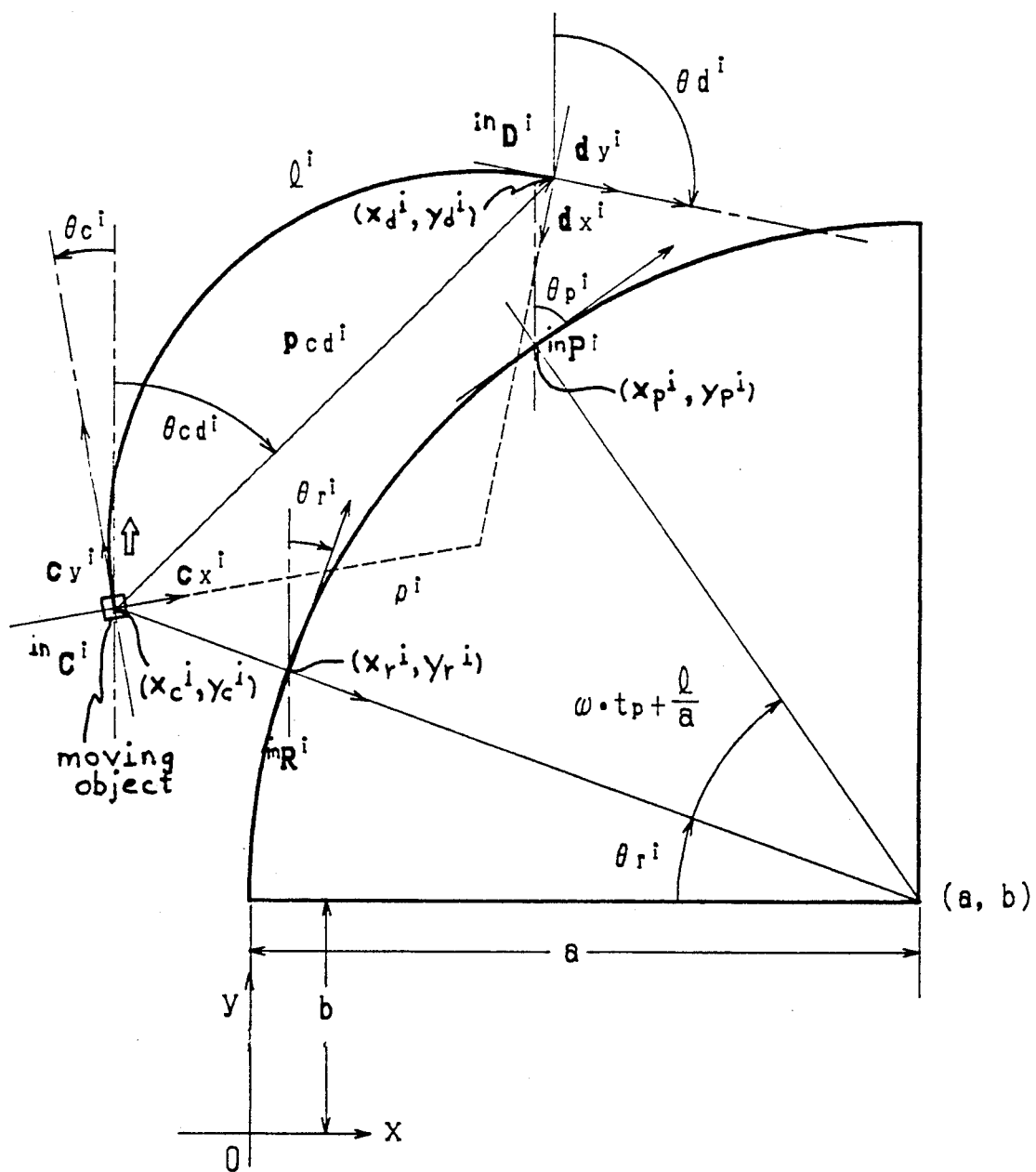
FIG. 3 is an explanatory view of a guiding method.

FIG. 3 is an explanatory view of the operational equation, in which an origin of internal coordinates (x, y) is indicated at O, and the coordinates of the center of gyration of the circular traveling path at (a, b) of the internal coordinates. When the coordinates (a, b) of the center of gyration are decided, by using the coordinates (a, b), coordinates ($x_r^i$, $y_r^i$) of an origin of the target attitude $^{in}R^i$ on the intersecting point of a segment connecting the present attitude $^{in}C^i$ and coordinates (a, b), with the traveling path are obtained by using the gyrating angle $\theta_r^i$. The gyrating angle $\theta_r^i$ can be represented as the following equation (2) by coordinates ($x_c^i$, $y_c^i$) of the origin of the present attitude $^{in}C^i$.

$$\theta_r^i = \tan^{-1} \frac{(y_c^i - b)}{(x_c^i - a)} \quad (2)$$

Thus, coordinates ($x_r^i$, $y_r^i$) of the origin of the target attitude $^{in}R^i$ can be represented by the following equations (3), (4).

$$x_r^i = a(1 - \cos \theta_r^i) \quad (3)$$

$$y_r^i = b - a \sin \theta_r^i \quad (4)$$

Where, an angle rotating clockwise is negative.

Thus, the present attitude $^{in}C^i$ and target attitude $^{in}R^i$ can be represented in homogeneous transformation forms by the following equations (5), (6).

$$^{in}C^i = \begin{bmatrix} \cos\theta_c^i & -\sin\theta_c^i & 0 & x_c^i \\ \sin\theta_c^i & \cos\theta_c^i & 0 & y_c^i \\ 0 & 0 & 1 & 0 \\ 0 & 0 & 0 & 1 \end{bmatrix} \quad (5)$$

$$^{in}R^i = \begin{bmatrix} \cos\theta_r^i & -\sin\theta_r^i & 0 & a(1 - \cos\theta_r^i) \\ \sin\theta_r^i & \cos\theta_r^i & 0 & b - a\sin\theta_r^i \\ 0 & 0 & 1 & 0 \\ 0 & 0 & 0 & 1 \end{bmatrix} \quad (6)$$

From the equations (5), (6), the guide error quantity $\delta E^i$ is obtained by using equation (1). Guide error quantity $\delta E^i$ shows a parallel and rotational moving quantity of the target attitude $^{in}R^i$ bringing the target attitude $^{in}R^i$ in alignment with the present attitude $^{in}C^i$. The guide error quantity $\delta E^i$ can be represented by the following equation (7) from equation (1), $$\delta E^i = {^{in}C^i} \cdot ({^{in}R^i})^{-1} \tag{7}$$

and inverse matrix $({^{in}R^i})^{-1}$ of the guide error by the equation (8).

$$({^{in}R^i})^{-1} = \begin{bmatrix} C_r & S_r & 0 & -C_r \cdot a(1-C_r) - S_r(b-a \cdot S_r) \\ S_r & C_r & 0 & S_r \cdot a(1-C_r) - S_r(b-a \cdot S_r) \\ 0 & 0 & 1 & 0 \\ 0 & 0 & 0 & 1 \end{bmatrix} \tag{8}$$

Where, $C_r = \cos\theta_r^i \quad S_r = \sin\theta_r^i$

Thus, by substituting equations (5) and (8) into equation (7), the guide error quantity $\delta E^i$ is obtained as the following equation (9).

$$\delta E^i = \begin{bmatrix} C_{c-r} & -S_{c-r} & 0 & C_r\{-a(1-C_r) + x_c^i\} + S_r(-b + a \cdot S_r + y_c^i) \\ S_{c-r} & C_{c-r} & 0 & S_r\{a(1-C_r) - x_c^i\} + C_r(-b + a \cdot S_r + y_c^i) \\ 0 & 0 & 1 & 0 \\ 0 & 0 & 0 & 1 \end{bmatrix} \tag{9}$$

Where, $C_r = \cos\theta_r^i \quad S_r = \sin\theta_r^i$ $C_{c-r} = \cos(\theta_c^i - \theta_r^i) \quad S_{c-r} = \sin(\theta_c^i - \theta_r^i)$ Since, $^{in}C^i$ is on x-axis of $^{in}R^i$, elements (2, 4) of the guide error quantity $\delta E^i$ have no deviation in the direction y and are always zero. That is, $$S_r\{a(1-C_r) - x_c^i\} + C_r(-b + a \cdot S_r + y_c^i) = 0$$

The x-axis of $^{in}R^i$ is the line connected between $(x_c^i, y_c^i)$ and $(a, b)$, and this line passes the origin of $^{in}R^i$ or $(x_r^i, y_r^i)$, and the y-axis of $^{in}R^i$ is the largest. Therefore, the deviation in y-direction is zero.

Also, elements (1, 4) of the guide error quantity $\delta E^i$ indicate a segment between origins of the present attitude $^{in}C^i$ and target attitude $^{in}R^i$. Thus, the positional deviation $\delta S^i$ between the target attitude $^{in}R^i$ and present attitude $^{in}C^i$ becomes elements (1, 4) of $\delta E^i$, namely, as shown in the following equation (10), and the directional deviation $\delta\theta^i$ becomes as shown in the following equation (11).

$$\delta S^i = \cos\theta_r^i \{-a(1-\cos\theta_r^i) + x_c^i\} + \sin\theta_r^i (-b + a \cdot \sin\theta_r^i + y_c^i) \tag{10}$$

$$\delta\theta^i = \theta_c^i - \theta_r^i \tag{11}$$

The two deviations aforementioned are defined as the guide deviation $\delta^i$ in a vector form as shown in the following equation (12).

$$\delta^i = [\delta S^i, \delta\theta^i] \tag{12}$$

Next, on the basis of guide deviation $\delta^i$ and the predicted time tp, instantaneous target matrix $^{in}D^i$ is obtained by the following equation (13).

$$^{in}D^i = {^{in}P^i} \cdot \delta E_d^i \tag{13}$$

Where, $^{in}P^i$ is a vector indicating the attitude including the position and direction of a point, where $^{in}R^i$ is rotated by $\omega \cdot tp$ in the moving direction of the car body on the circular traveling path and further viewing ahead by only 1/a.

Coordinates $(x_p^i, y_p^i)$ of its origin become equations (14), (15).

$$x_p^i = a(1 - \cos\theta_p^i) \tag{14}$$

$$y_p^i = b - a \sin\theta_p^i \tag{15}$$

Where,
$\theta_p^i = \theta_r^i + \omega \cdot tp + (1/a)$
$\omega = v^i/a$
$v^i$: center velocity.

Thus, vector $^{in}P^i$ becomes the following equation (16).

$$^{in}P^i = \begin{bmatrix} \cos\theta_p^i & -\sin\theta_p^i & 0 & a(1 - \cos\theta_p^i) \\ \sin\theta_p^i & \cos\theta_p^i & 0 & b - a \sin\theta_p^i \\ 0 & 0 & 1 & 0 \\ 0 & 0 & 0 & 1 \end{bmatrix} \tag{16}$$

Also, vector $\delta E_d^i$ is defined by the following equation (17).

$$\delta E_d^i = \begin{bmatrix} C_{d-p} & -S_{d-p} & 0 & K \cdot \delta \\ S_{d-p} & C_{d-p} & 0 & |K \cdot \delta| \\ 0 & 0 & 1 & 0 \\ 0 & 0 & 0 & 1 \end{bmatrix} \tag{17}$$

Wherein,
$C_{d-p} = \cos(\theta_d^i - \theta_p^i)$
$S_{d-p} = \sin(\theta_d^i - \theta_p^i)$
$K = [k_1, k_2]$: coefficient vector.

Thus, from the equations (16), (17), an instantaneous target $^{in}D^i$ becomes the following equation (18).

$$^{in}D^i = \begin{bmatrix} C_d & -S_d & 0 & C_p K \cdot \delta - S_p |K \cdot \delta| + a(1 - C_p) \\ S_d & C_d & 0 & S_p K \cdot \delta + C_p |K \cdot \delta| + b - a \cdot S_p \\ 0 & 0 & 1 & 0 \\ 0 & 0 & 0 & 1 \end{bmatrix} \tag{18}$$

Where, $C_d = \cos\theta_d^i \quad S_d = \sin\theta_d^i$ $C_p = \cos\theta_p^i \quad S_p = \sin\theta_p^i$ Thus, coordinates ($x_d^i$, $y_d^i$) of the origin of guide target $^{in}D^i$ are obtained by the following equations (19), (20) by referring to its elements (1, 4) and (2, 4).

$$x_d^i = K \cdot \delta \cos\theta_p^i - |K \cdot \delta| \sin\theta_p^i + a(1 - \cos\theta_p^i) \quad (19)$$

$$y_d^i = |K \cdot \delta| \cos\theta_p^i + K \cdot \delta \sin\theta_p^i + b - a\sin\theta_p^i \quad (20)$$

Where, $K \cdot \delta = k_1 \cdot \delta S^i + k_2 \cdot \delta \theta^i$ (scalar quantity)

Then, a circular arc $l^i$ passing the present attitude $^{in}C^i$ and instantaneous target $^{in}D^i$ and contacting to y-axis (moving direction of the car body 1) of the present attitude $^{in}C^i$ is determined as the instantaneous target course in the i th control period, and its radius of gyration $\rho^i$ is obtained as follows. That is, there is a geometric relationship shown in the following equations (21), (22) between unit vectors $cx^i$, $cy^i$ and $dx^i$, $dy^i$ of respective x, y-axis positive directions of the present attitude $^{in}C^i$ and instantaneous target $^{in}D^i$, and vector $p_{cd}^i$ connecting origins of $^{in}C^i$ and $^{in}D^i$, $$p_{cd}^i \cdot cy^i = p_{cd}^i \cdot dy^i \quad (21)$$

$$p_{cd}^i = \rho^i \cdot (cx^i - dx^i) \quad (22)$$

from equation (21), $$\theta_d^i = 2\theta_{cd}^i - \theta_c^i \quad (23)$$

is obtained, and from equation (22), a radius of gyration $\rho^i$ becomes, $$\rho^i = (x_d^i - x_c^i)/(\cos\theta_c^i - \cos\theta_d^i) \quad (24)$$

or $$\rho^i = (y_d^i - y_c^i)/(\sin\theta_c^i - \sin\theta_d^i) \quad (25)$$

In the above equations (24), (25), $x_d^i$, $y_d^i$ are obtained from the equations (19), (20), and since $\theta_{cd}^i$ is represented by the following equation (26), $$\theta_{cd}^i = \tan^{-1} \frac{x_d^i - x_c^i}{y_d^i - y_c^i} \quad (26)$$

$\theta_d^i$ can be obtained by substituting equation (26) into equation (23), thereby radius of gyration $\rho^i$ can be obtained. Using whether equation (24) or equation (25) is decided by an angle of $\theta_c^i$. That is, when $\theta_c^i$ is close to 0, equation (25) represented by sine has a larger denominator, and when $\theta_c^i$ is close to 90°, equation (24) represented by cosine has a larger denominator, thus a radius of gyration $\rho^i$ becomes more accurate. Thus, equation (25) is used when $0 \leq |\theta_c^i| \leq \pi/4$, and equation (24) is used when $\pi/4 < |\theta_c^i| < (\frac{3}{4})\pi$. When the radius of gyration $\rho^i$ is positive, gyration is clockwise.

From the resulting radius of gyration $\rho^i$, velocity command values $V_L^{icmd}$, $V_R^{icmd}$ to the right and left drive wheels $1l$, $1r$ are obtained by the following equations (27), (28).

$$V_L^{icmd} = (\rho^i + T/2)v^i/\rho^i \quad (27)$$

$$V_R^{icmd} = (\rho^i - T/2)v^i/\rho^i \quad (28)$$

Where, $v^i$: center velocity

T: treads of right and left drive wheels $1l$, $1r$

Calculations aforementioned are executed by the guide control circuit 20, repeated at every predetermined time, and by controlling the motors $21l$, $21r$ for the right and left drive wheels $1l$, $1r$, the car body 1 is guided on the target course $l^i$ composed of infinitesimal circular arcs having different radii of gyration $\rho^i$ connected smoothly, so as to converge to the circular arc which is the traveling path.

Next, results of simulation according to a method of the present invention will be described with reference to the figure shown in FIG. 4. In the figure, a thick line shows a traveling path formed circularly and a broken line e, a thin line f, a two-dot chain line g and a one-dot chain line h show loci of the car body 1 when the positional deviation and velocity are set as the conditions specified in the following. It is also assumed that, the car body 1 is steered accurately in response to the velocity command values $V_L^{icmd}$, $V_R^{icmd}$ obtained from the equations (27), (28), and the inertia of car body 1 is neglected.

| (Conditions) | |
|---|---|
| radius of path a | 1000 mm |
| initial positional deviation $\delta S^1$ | −200 mm (e,f) |
| | 200 mm (g,h) |
| initial directional deviation $\delta \theta^1$ | 0 rad |
| predicted time tp | 1.0 sec. |
| coefficient vector | K = [0.5, 50] |
| center velocity $v^i$ | 8 m/min (f,g) |
| | 16 m/min (e,h) |

Figure 4:
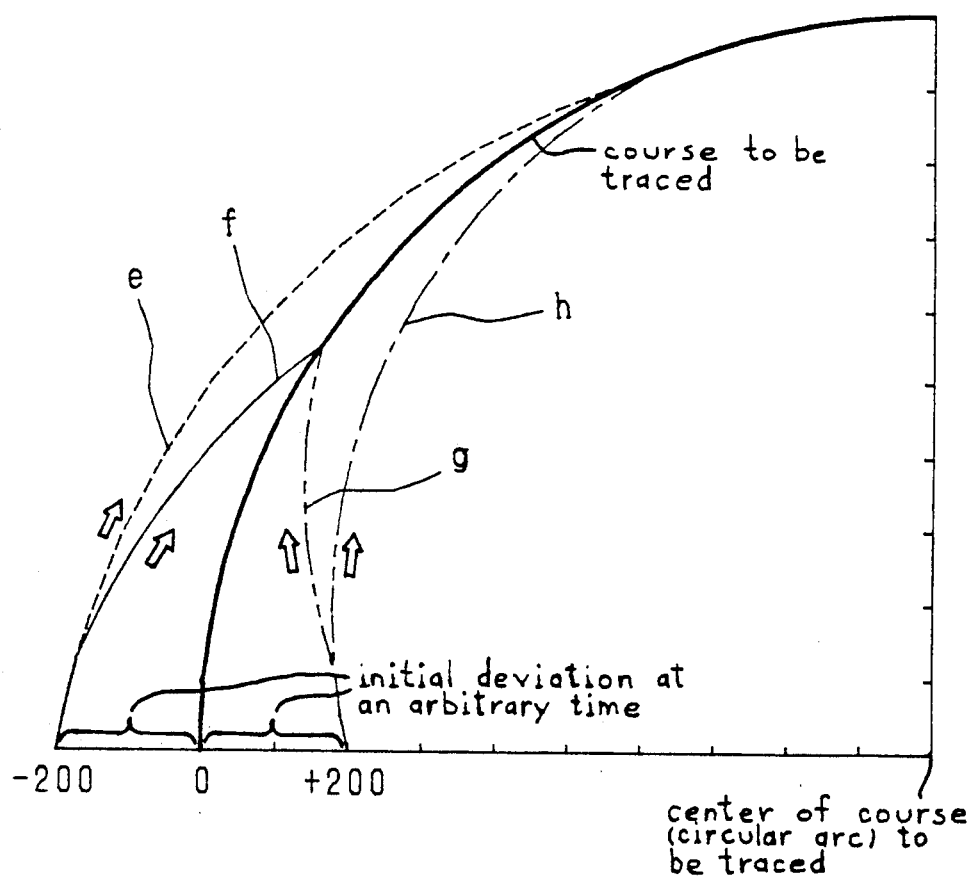
FIG. 4 is an explanatory view of the simulation result.

As it is apparent from FIG. 4, though approaching forms to the traveling path are different depending upon the center velocity $v^i$, in either case it is steered so as to converge smoothly to the traveling path. By judging the simulation results by various evaluation functions and obtaining the optimum condition, the moving time can be shortened.

In the embodiment, though a case where the present invention is applied in a spin-turn type unattended vehicle in which the right and left drive wheels are controlled independently is described, the present invention is not limited thereto, it will be appreciated that it may also be applied to the vehicle in which the steering and movement are effected independently.

In the present embodiment, though the present invention is applied in a circular traveling path, it is to be understood that the present invention can also be applied in the traveling path formed by any curves by approximating it in the circular arc, and even in the traveling path formed by the straight line, it can be applied by regarding the radius of path as the infinite.

As described hereinabove, according to the present invention, by determining a target attitude by the position of an intersecting point of a segment, connecting a present attitude consisting of the present position and direction of a car body and the center of circular arc of a traveling path, with the circular arc, and the direction on the intersecting point, obtaining a guide error quantity which is the deviation between the target attitude and present attitude, and deciding the instantaneous target therefrom for steering, the moving object can be steered smoothly along the traveling path formed by curves, thus the moving time can be shortened as well as the restriction of traveling path can be minimized.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A method of guiding a moving object to travel along a present traveling path, which comprises the steps of
    calculating the present traveling position and moving direction of said moving object,
    calculating the position of an intersecting point of a straight line with a circular arc, the straight line connecting the center of said circular arc and said traveling position of said moving object, the intersecting point being on the straight line and between said center and said traveling position, and calculating the tangent direction at said intersecting point with respect to said circular arc,
    calculating a guide error quantity including a positional deviation and directional deviation between said calculated position and tangent direction and said present traveling position and moving direction of said moving object,
    setting a target position to be traveled on the basis of said guide error quantity,
    calculating a radius of gyration from said present traveling position and moving direction to the set target position, and
    controlling traveling of said moving object by the calculated radius of gyration.

2. An apparatus for guiding a moving object to travel along a present traveling path, comprising,
    attitude calculating means for calculating the present traveling position on a plane of said moving object,
    target attitude calculating means for calculating the position of an intersecting point of a straight line with a circular arc, the straight line connecting the center of said circular arc and the calculated present traveling position of said moving object, the intersecting point being on the straight line between said center and said traveling position, and calculating the tangent direction at said intersecting point with respect to said circular arc;
    error quantity calculating means for calculating a guide error quantity including the positional deviation and directional deviation between said calculated position and tangent direction and the present traveling position and moving direction of said moving object;
    target position setting means for setting a target position to be traveled on the basis of said guide error quantity;
    radius calculating means for calculating a radius of gyration from said present traveling position and moving direction to the set target position; and
    control means for controlling traveling of said moving object by the calculated radius of gyration.

3. An apparatus for guiding a moving object as set forth in claim 2, wherein said moving object is an unattended transporting vehicle which is adapted for making a spin turn and includes means for calculating present traveling position and moving direction on the basis of the number of revolutions of the right and left drive wheels.

4. A guidable vehicle in combination with an apparatus for guiding said vehicle to travel along a present traveling path that includes circular arcs, the apparatus comprising:
    attitude calculating means for calculating the present traveling position and moving direction on a plane of said vehicle;
    target attitude calculating means for calculating the position of an intersecting point of a straight line with a circular arc, the straight line connecting the center of said circular arc and the calculated present position of said vehicle, the intersecting point being in the straight line between said center and said traveling position and calculating the tangent direction at said intersecting point with respect to said circular arc;
    error quantity calculating means for calculating a guide error quantity including the positional deviation and directional deviation between said calculated position and tangent direction and the present traveling position and moving direction of said vehicle;
    target position setting means for setting a target position to be traveled on the basis of said guide error quantity;
    radius calculating means for calculating a radius of gyration from said present traveling position and moving direction to the target position set;
    control means for controlling traveling of said vehicle by the calculated radius of gyration;
    fixed point detecting means for detecting position of fixed points; and
    correction control means for controlling said vehicle to detect a relative divergence between the attitude of the vehicle guided by said guiding apparatus and the fixed points, and to solve the divergence.

* * * * *